United States Patent [19]

Krasser

[11] 4,171,862
[45] Oct. 23, 1979

[54] TERMINAL BOARD FOR ELECTRICAL EQUIPMENT

[75] Inventor: Fritz Krasser, Altdorf, Fed. Rep. of Germany

[73] Assignee: Ellenberger & Poensgen GmbH, Altdorf, Fed. Rep. of Germany

[21] Appl. No.: 892,166

[22] Filed: Mar. 31, 1978

[30] Foreign Application Priority Data

Apr. 9, 1977 [DE]  Fed. Rep. of Germany ... 7711221[U]
Apr. 9, 1977 [DE]  Fed. Rep. of Germany ....... 2715861

[51] Int. Cl.² ............................................. H01R 9/02
[52] U.S. Cl. ................................ 339/198 H; 361/426
[58] Field of Search ................. 339/198, 19, 147, 222; 200/307; 361/426, 331, 346, 347, 348, 350, 353, 357, 363, 376

[56] References Cited

U.S. PATENT DOCUMENTS

| | | | |
|---|---|---|---|
| 2,805,294 | 9/1957 | Edmunds | 339/198 N |
| 2,892,176 | 6/1959 | Gordon | 339/198 G |
| 3,189,866 | 6/1965 | Lazar | 339/198 P |
| 3,253,252 | 5/1966 | Piperato | 339/198 P |
| 3,255,330 | 6/1966 | MacKenzie | 339/19 |
| 3,694,701 | 9/1972 | Stanback | 339/198 N |
| 3,848,951 | 11/1974 | Michaels | 339/198 H |

FOREIGN PATENT DOCUMENTS

2300137  7/1974  Fed. Rep. of Germany ........... 361/426

*Primary Examiner*—Gerald P. Tolin
*Attorney, Agent, or Firm*—Spencer & Kaye

[57] ABSTRACT

A terminal board assembly made of electrical insulating material and composed of elements for the mounting of a row of electrical devices and elements for connecting electric wires to each device, the mounting and connecting elements associated with each device being arranged in a row which extends perpendicular to the row of devices, the assembly being constituted by a plurality of identical terminal board units connected together in an interlocked manner and lying in a common plane in the direction of the row of devices, each unit containing all of the mounting and connecting elements for at least one electrical device.

20 Claims, 9 Drawing Figures

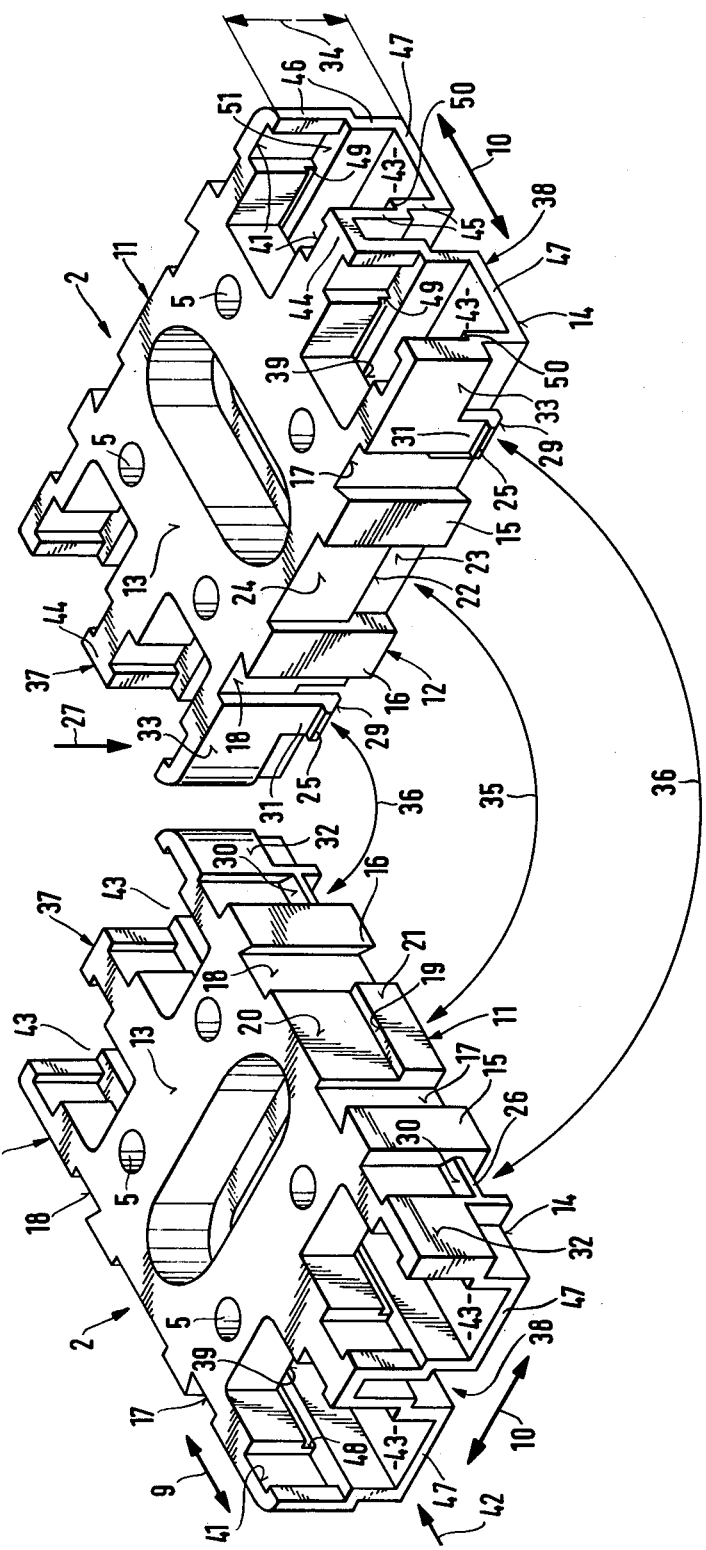

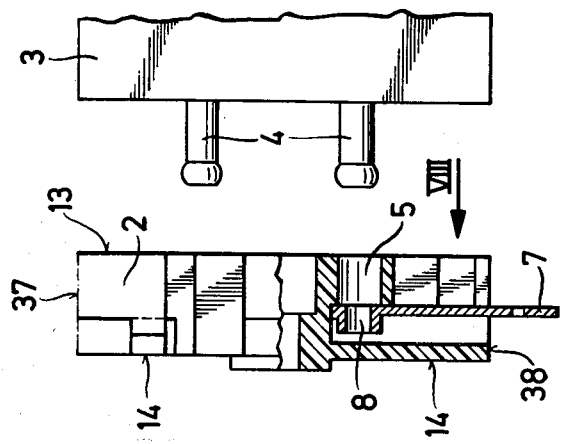
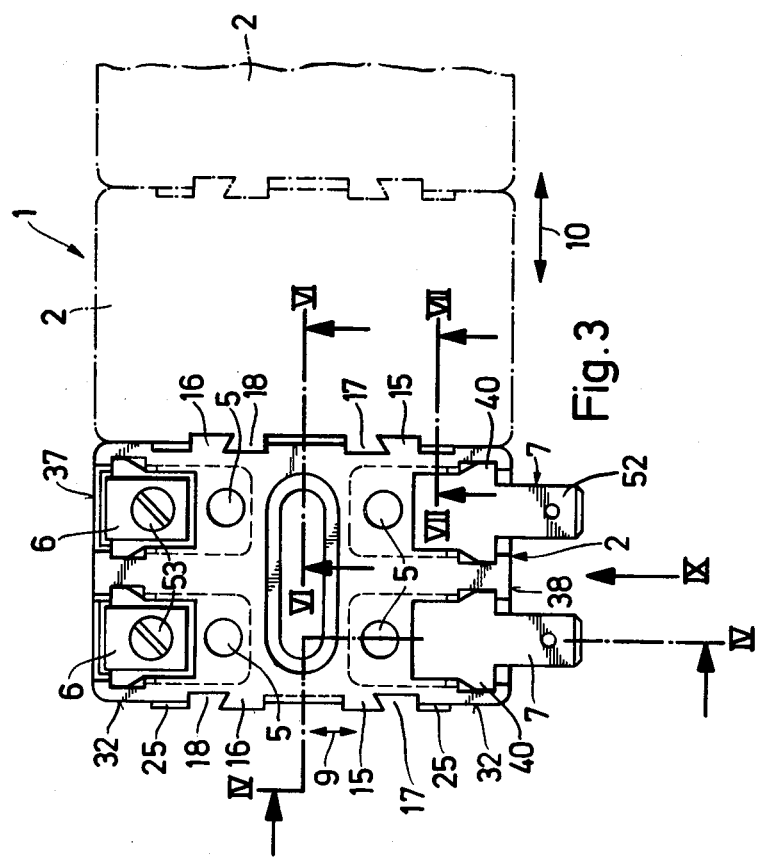

TERMINAL BOARD FOR ELECTRICAL EQUIPMENT

BACKGROUND OF THE INVENTION

The present invention relates to a terminal board of insulating material of the type for mounting rows of electrical switching devices, such as circuit breakers.

It is known to produce such terminal boards in different sizes depending on whether they are intended for mounting two, four or six circuit breakers. Different molds are required to produce these different terminal board sizes and the need to stock terminal boards of different sizes also increases the costs of storage.

SUMMARY OF THE INVENTION

It is an object of the present invention to simplify the production and storage of such terminal boards and to reduce their cost.

A further object of the invention is to provide a simple and effective form of construction and positioning for the electrical connections on the terminal board.

These and other objects are accomplished according to the present invention in a terminal board assembly made of electrical insulating material and composed of elements for the mounting of a row of electrical devices and elements for connecting electric wires to each device, the mounting and connecting elements associated with each device being arranged in a row which extends perpendicular to the row of devices, by constituting the assembly of a plurality of identical terminal board units connected together in an interlocked manner and lying in a common plane in the direction of the row of devices, each unit containing all of the mounting and connecting elements for at least one electrical device.

The invention is thus based on the idea of creating terminal board assemblies of any desired size by selectively interconnecting identically sized terminal board units. To produce terminal board assemblies of any size it is then only necessary to have the required number of terminal board units. The only costs involved are those for the mold for this terminal board unit. Storage costs are also reduced to those required for storing the required number of terminal board units.

When the connection between units is effected by means of positive-locking, plug-in elements extending perpendicularly to the common plane of the units, it becomes easy to subsequently supplement already installed terminal boards, which are disposed, for example, in recesses or the like, without cramped space condidions impeding or preventing interconnection. The terminal board unit which is to be connected to an already installed terminal board unit, or to a partial assembly, is simply plugged or pushed, in the direction toward the installation surface into engagement with a previously installed terminal board unit.

Other features of the present invention relate to the structural configuration of the plug-in connections between the terminal board units to assure good positional stability of the terminal board produced of a plurality of interconnected terminal board units. In the final connected state, the plugged together terminal board units should have their cover faces disposed in a common plane.

The terminal board units should be easy to fit, or plug, together. However, in the connected, interlocked, position they should normally not be detachable from one another.

Additional features of the invention relate to the design and mounting of the plug-in connectors provided by the terminal board for electrical devices, on the one hand, and for electrical wires, on the other hand, without their design necessarily being bound to the configuration of the terminal board in accordance with the invention.

In preferred embodiments of the invention, each unit is provided with recesses having undercuts for receiving detent projections of an adjacent unit for connecting the units together, and the lateral walls of the recesses have a certain positional elasticity so that they initially spring apart when the plug-in connections are brought together, and then spring back to their desired detaining position. In this connection, a thin-walled design for the recess walls and connecting bars has the additional significance that it produces favorable molding conditions in the manufacture of parts and conserves material.

BRIEF DESCRIPTION OF THE DRAWINGS

FIG. 1 is a perspective view of a preferred embodiment of the body of a terminal board unit according to the invention.

FIG. 2 is a perspective view of a terminal board unit identical to that of FIG. 1, which can be connected together with the terminal board unit of FIG. 1.

FIG. 3 is a top plan view showing the cover surface of a completely assembled terminal board unit having the body shown in FIGS. 1 and 2, with the appearance of a terminal board assembly composed of three connected together terminal board units indicated by dot-dash lines.

FIG. 4 is a partially cross-sectional view along the line IV—IV of FIG. 3.

FIG. 5 is a simplified representation of an electrical device provided with protruding plug pins which is to be plugged into a terminal board unit.

FIG. 9 is a front view of a terminal board body taken in the direction of the arrow IX of FIG. 3.

DESCRIPTION OF THE PREFERRED EMBODIMENTS

Figure 6:
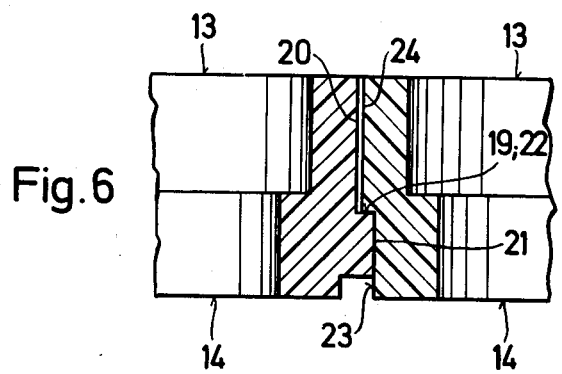
FIG. 6 is a cross-sectional detail view along the section line VI—VI of FIG. 3.
Figure 7:
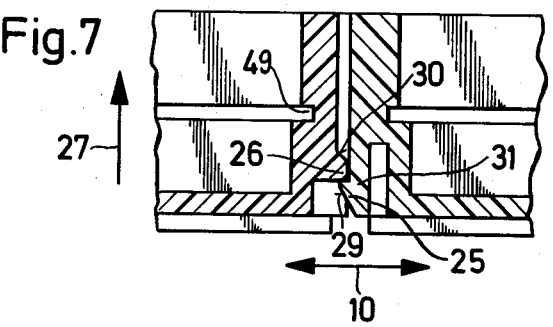
FIG. 7 is a cross-sectional detail view along the section line VII—VII of FIG. 3, with electrical connectors of the board units removed.

Since all of the figures present different views of the same embodiment, the following description will refer to all figures as a group, unless particular figures are specified.

As shown, particularly in FIG. 3, a complete terminal board assembly 1 is formed of a plurality, e.g. 3, of individual terminal board units which are connected together in a positive locking manner. Each terminal board unit is composed of a body 2 of insulating material provided with electrical connector pairs, each pair being composed of a screw terminal 6 and a plug connector 7 of conductive material. Each body 2 is formed to present receptacles 5 via which the connector pins 4 of a switching device 3, such as a circuit breaker, shown in FIG. 5, can be connected to a respective connector pair. Each of the terminals 6 and connectors 7 presents a bore 8 aligned in a respective receptacle 5 to establish an electrically conductive connection with a respective pin 4 of an electrical device 3 into bores 8. The free ends of terminals 6 can be connected to electrical wires, while the free ends of connectors 7 can be connected to associated receptacles.

The mounting and connecting elements 5–8 for each electrical device 3 are arranged in a row which extends essentially in the direction of arrows 9 of FIG. 3, which is at right angles to the direction of arrows 10 of FIG. 3, along which the electrical devices 3 are spaced on the terminal board assembly.

As shown in FIGS. 1–3, each terminal board body 2 is provided with mounting and connecting elements 5–8 for two electrical devices 3.

Each body 2 has two lateral side walls 11 and 12 which extend in the direction 9, approximately at right angles to the direction 10 of a row of units and each side wall is provided with two protruding dovetail tenons 15 and 16 which extend perpendicularly to opposed cover faces 13 and 14. At the locations each side wall 11 and 12 is provided with the two dovetail tenons 15 and 16, the other side wall is provided with two dovetail mortises 17 and 18. Upon connecting together two terminal board bodies 2, the dovetail tenons 15 and 16 on a side wall of one body engage in the mating mortises 17 and 18 of the associated side wall of the adjacent terminal board body 2.

The side wall 11 of each body 2 is provided with a stepped abutment 19 between the two dovetail tenons 15 and 16, which abutment protrudes in the direction 10 and extends perpendicularly to the cover faces 13 and 14. The stepped abutment 19 is defined between a recessed surface 20, which starts at the level of the first cover face 13 and is perpendicular thereto, and a projecting surface 21 which starts at the second cover face 14, surface 21 thus being further than surface 20 from the center of body 2.

The side wall 12 of each body 2 is provided with a stepped abutment 22 which is arranged to cooperate, and mate, with the stepped abutment 19 of an adjacent body 2. The stepped abutment 22 is defined between a recessed surface 23, which starts at the second cover face 14 and is perpendicular thereto, and a projecting surface 24, i.e. a surface which protrudes further from the center of its associated body 2 in the direction 10 of the row and is likewise perpendicular to cover face 13.

When two terminal board units are to be connected together, the stepped abutments 19, 22 permit such connection to be effected in only one direction and limit the extent of relative movement between the units in such a manner that when there is contact between the abutments, all of the cover faces 13 and all of the cover faces 14 of the row of terminal board units are flush with one another, i.e. are arranged in the same plane.

The side wall 12 of each body 2 is provided with two latching tongues 25 which are resiliently movable in the direction 10 of the row. Each tongue 25 is positioned to interact with a respective one of two protruding detent ribs 26 provided on side wall 11 of each body 2. Latching tongues 25 and detent rib 26 extend approximately at right angles to the direction 27 in which body 2 of FIG. 2 moves relative to body 2 of FIG. 1 when these two bodies are being connected together. The detent ribs 26 are positioned at side wall 11 so as to make the latching with tongues 25 effective, during connection together of two terminal board units, as soon as the cover faces 13 and 14 of adjacent bodies 2 are flush with one another. The detent surfaces between each latching tongue 25 and detent rib 26 are perpendicular to the insertion direction 27 in such a way that they are effective to prevent relative movement opposite to the insertion direction 27 and thus, after completed connection of two terminal board units, normally prevent their detachment from one another.

In order to facilitate plugging together of the terminal board bodies 2, the back of each latching tongue 25 and of each detent rib 26 is provided with an oblique surface 29 or 30 designed in the form of a ramp which is effective in the insertion direction 27. Each latching tongue 25 is formed at the free end of a thin-walled rib 31 which extends in the insertion direction 27. The rib 31 is spaced from the adjacent side wall 12 and is designed so that it can spring back away from side wall 12, in the direction 10, toward wall 11 of the adjacent body 2 when, during insertion, the oblique surface 30 of the cooperating detent rib 26 has slid past the oblique surface 29 of the latching tongue 25.

The side walls 11 and 12 of each terminal board body 2 are designed so that when connected together they are flush against one another in several areas, for example in the region of the surfaces 20, 21, 23, 24 and in their outer regions 32, 33 approximately over the entire height 34 of the terminal board bodies 2. This creates positional stability for the terminal board units once they have been plugged together in that the cover faces 13, 14 of the terminal board bodies 2 are in the same plane and can essentially not be pivoted or twisted relative to one another.

The terminal board bodies 2 are made of plastic in one piece with the dovetail tenons 15 and 16, the stepped abutments 19 and 22, the latching tongues 25 and the detent ribs 26. The mutual coaction of the stepped abutments 19 and 22 and the latching tongues 25 with the detent ribs 26 is shown in FIGS. 1 and 2 by the arrows 35 and 36, respectively.

When the two terminal board bodies 2 of FIGS. 1 and 2 are plugged together the dovetail tenons 15 and 16 of the one side wall 11 of one terminal board body are pushed into the mating dovetail mortises 17 and 18 of the other terminal board body in the insertion direction 27 until the stepped abutments 19, 22 abut against one another and at the same time the latching tongues 25 engage behind the detent ribs 26 to thus prevent disconnection of the two bodies. Then the two terminal board bodies 2 take on a highly stable configuration in which they are parallel to one another and their cover faces 13 and 14 are flush with one another.

Where hereabove mention was made of dovetail tenons and mortises, this also includes half dovetail tenons and moritses as well as at least on one side an engagement in the sense of a dovetail fit or dovetail joint, respectively.

Figure 8:
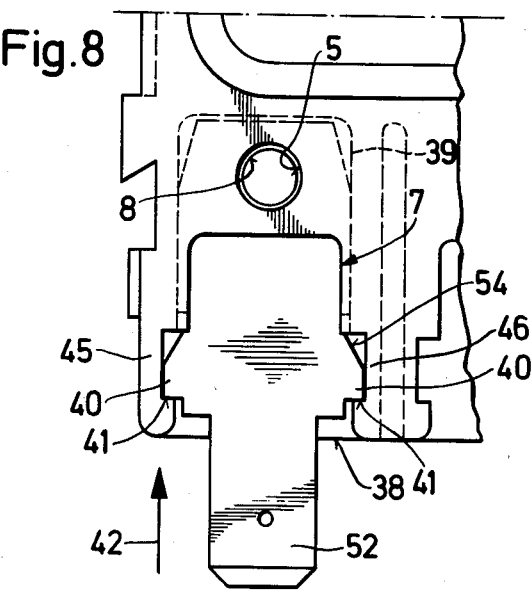
FIG. 8 is a detail view to an enlarged scale taken in the direction of the arrow VIII of FIG. 4.

The terminals 6 and 7 are designed, as shown in FIGS. 3, 4 and 8, in leaf form and can each be inserted into the interior of a terminal board body from the two free end walls 37 and 38 therof. Each body 2 is provided for this purpose with insertion slits 39 which are oriented approximately parallel to cover faces 13 and 14. Each of terminals 6 and connectors 7 is provided along opposed longitudinal edges with detent tabs 40 arranged to engage in corresponding recess 41 that is provided in the terminal board bodies. The detent tabs 40 and recesses 41 have surfaces which face one another in mutual engagement and which are approximately at right angles to the direction 42 (FIG. 1) of insertion of each terminal or connector so that these surfaces engage one another to prevent withdrawal of the terminal or connector once it has been fully inserted.

The open end of each insertion slit 39 opens into a recess 43 which is open to the first cover face 13 and to the adjacent free end wall 37 or 38, respectively, of the terminal board body 2. The body portions defining adjacent recesses 43 at each end of the body are connected together only in the area of the first cover face 13 by means of thin-walled bars 44. The body walls 45 and 46 defining the recesses have a U-shaped cross-sectional profile in a vertical sectional plane extending perpendicular to faces 13 and 14 in the direction 10 and are connected together only in the region of the free ends of the U-shaped profiles by means of horizontal bars 44. The insertion slits 39 are disposed approximately in the center midway between the upper and the lower ends of the U-shaped profiles. The lower horizontal connecting bar 47 between the two arms 45 and 46 of each U-shaped profile borders on the second cover face 14 of the terminal board body 2.

The cross-sectional thicknesses of the arms 45 and 46 of the U-shaped profiles and of their upper and lower connecting bars 44 and 47 are about equal and the arms are given thin walls so that an elastically yielding spring effect is produced to facilitate insertion of terminals 6 and connectors 7.

The recesses 41 for the engagement of the detent tabs 40 lie outside of the regions enclosed by insertion slits 39 and are formed in the lateral walls 45 and 46. The insertion slits 39 lie inside the recesses 43 for at least part of their length and are there designed as grooves 48 and 49 formed in lateral walls 45 and 46.

In order to assure secure contact of the leaf-shaped terminals 6 and connectors 7, the walls 45 snd 46 are set inwardly below grooves 48 and 49 so that a step 50 or 51, respectively, is formed between the lower part of each wall 45 or 46 and the part disposed above groove 48 or 49.

In the area of their free ends, the connectors 7 are provided with male plugs 52. In contradistinction thereto, terminals 6, in the region of their free ends, are provided with connecting screws 53 and conductive clamping pieces for the connection of electrical wires (not shown).

In the inserted position of terminals 6 and connectors 7, bores 8 therein are aligned with the insertion openings 5, as shown in FIG. 4, which have been formed in the terminal board body 2 from the first cover face 13, so that the plug pins 4 extend through the plug openings 5 into the terminal board body 2 and into the bores 8 of the oppositely disposed connector and terminal, where they are gripped in the bores 8 in a force locking manner to provide a good electrical and mechanical connection.

Terminals 6 and connectors 7 can be fixed to the terminal board body 2 in a simple manner in that they are simply inserted from the outside into the insertion slits 39 until the detent tabs 40 engage in the recesses 41 in the walls 45 and 46. In the region of their ends 54, facing in the insertion direction 42, as shown in FIG. 8, the detent tabs 40 are chamfered so as to form ramps. In view of the fact that the walls 45 and 46 are arranged with their connecting bars 44 and 47 to follow a meander shaped path in the direction 10, and that the insertion slits 39 are disposed in the center of the walls 45 and 46, the latter are deflected slightly apart when the detent tabs 40 are inserted until the detent tabs 40 engage in the recesses 41, whereupon walls 45 and 46 spring together again.

It will be understood that the above description of the present invention is susceptible to various modifications, changes and adaptations, and the same are intended to be comprehended within the meaning and range of equivalents of the appended claims.

What is claimed is:

1. In a terminal board assembly composed of a support of electrical insulating material provided with elements for the mounting of electrical devices, which elements lie in a first row, and electrically conductive elements for connecting electric wires to each device, the mounting and connecting elements associated with each device being arranged in a second row which extends perpendicular to the first row, the improvement wherein: said assembly comprises a plurality of identical terminal board units connected together in an interlocked manner and lying in a common plane in the direction of the first row, each said unit containing all of the mounting and connecting elements for at least one electrical device; each said unit having two end walls extending perpendicularly to the second row in which its associated mounting and connecting elements are arranged, and being provided with insertion slits each extending from one of said end walls into the interior of said terminal board unit and oriented approximately parallel to a plane defined by the direction of the first row and the direction of the second row of said mounting and connecting elements associated with the respective unit, each said insertion slit holding a respective connecting element; each said connecting element has a flat shape and is provided, at opposed sides, with detent tabs which extend in the direction of insertion of each said connecting element in an associated one of said insertion slits, and each said unit is provided, in association with each said insertion slit, with two recesses each arranged to receive a respective detent tab of one said connecting element, each tab and each recess being provided with respective surfaces which extend approximately normally to the direction of insertion of the associated connecting element and which engage one another upon completion of insertion of said connecting element for preventing subsequent removal of said connecting element; each said terminal board unit has two opposed cover faces each extending between said end walls and parallel to the plane of orientation of said insertion slits; each said terminal board unit is provided with further recesses into each of which a respective insertion slit opens and each of which is open to a first one of said cover faces and to that one of said end walls from which its associated insertion slit extends, there being two said further recesses open to one of said end walls; the portions of each said unit delimiting two said further recesses which open to said one end wall are connected together only in the region of said first one of said cover faces; each said unit portion delimiting each one of said two further recesses is formed to give its associated further recess a U-shaped cross section in a plane parallel to said one end wall; each said unit includes a bar portion connecting together said portions delimiting said two further recesses; and each said insertion slit is located approximately midway between the top and bottom of the U-shape defining its associated further recess.

2. An arrangement as defined in claim 1 wherein each said terminal board unit has two lateral side walls, adjacent ones of said terminal board units are connected together along adjacent lateral side walls of said units, and each said side wall is provided with connection portions extending approximately perpendicularly to said common plane.

3. An arrangement as defined in claim 2 wherein each said side wall extends approximately perpendicularly to said common plane, said connection portions of one said side wall of each said unit include at least one portion defining a dovetail tenon and said connection portions of the other said side wall of each said unit include at least one portion defining a dovetail mortise formed and located so that said mortise on one said unit can receive said tenon on another said unit.

4. An arrangement as defined in claim 3 wherein said connection portions of one said side wall of each said unit include a plurality of said dovetail tenons and said connection portions of the other said side wall of each said unit include a plurality of said dovetail mortises.

5. An arrangement as defined in claim 2 wherein each said side wall of each said unit is provided with a stepped abutment which protrudes in the direction of the first row so as to define the relative positions of two connected together units in which the surfaces of said units which are parallel to said common plane are flush with one another.

6. An arrangement as defined in claim 2 wherein one said side wall of each said unit is provided with at least one latching tongue which yields elastically in the direction of the first row, and the other said side wall of each said unit is provided with a detent rib which corresponds with said latching tongue, and said latching tongue and detent rib of two adjacent connected together units are arrested in one another when the surfaces of said units which are parallel to said common plane are flush with one another.

7. An arrangement as defined in claim 6 wherein the arresting is effective only in the direction opposite to the direction of movement between two said units to connect them together.

8. An arrangement as defined in claim 7 wherein each said latching tongue and detent rib has a rear side provided with an inclinded surface defining a ramp that is effective in the direction of movement between two said units to connect them together and said one said side wall of each said unit is provided with a thin-walled rib which extends in such direction of movement and carries a respective latching tongue.

9. An arrangement as defined in claim 2 wherein each said unit has opposed cover faces extending parallel to said common plane and the connection portions on one said side wall include a dovetail mortise extending perpendicularly to said cover faces and the connection portions on the other said side wall include a dovetail tenon extending perpendicularly to said cover faces.

10. An arrangement as defined in claim 2 wherein said lateral side walls of each said unit extend approximately perpendicularly to the first row, and said side walls are formed such that adjacent side walls of such connected together units rest flush against one another in several regions over the entire dimension of said terminal board units perpendicular to said common plane.

11. An arrangement as defined in claim 1 wherein each said terminal board unit is provided with mounting and connecting elements for two juxtaposed electrical devices.

12. An arrangement as defined in claim 1 wherein each said unit is composed of an integral body formed with portions for connecting together adjacent units.

13. An arrangement as defined in claim 1 wherein each said unit portion delimiting each one of said further recesses includes a connecting bar defining the base of the associated U-shape and bordering on the second one of said cover faces.

14. An arrangement as defined in claim 13 wherein each said unit portion delimiting a U-shaped further recess and each said bar portion are constituted by thin walls of approximately equal thickness which enable each said unit portion delimiting a respective further recess to be resiliently deformable in the direction of the first row.

15. An arrangement as defined in claim 1 for the mounting of electrical devices provided with plug pins, wherein said mounting elements for each device include insertion openings formed in each said unit and extending from said first one of said cover faces to respective ones of said insertion slits in the regions thereof remote from their associated end walls, and each said connecting element is provided with a bore aligned with a respective insertion opening for receiving a respective plug pin.

16. An arrangement as defined in claim 1 wherein said two recesses associated with each said insertion slit are disposed at least partially outside of their associated insertion slit.

17. An arrangement as defined in claim 1 wherein each said insertion slit lies at least partly in its associated recesses.

18. An arrangement as defined in claim 1 wherein at least one of said connecting elements is provided with a male connecting prong.

19. An arrangement as defined in claim 1 wherein at last one of said connecting elements is provided with a screw terminal for connection of an electrical wire.

20. In a terminal board assembly composed of a support of electrical insulating material provided with elements for the mounting of electrical devices, which elements lie in a first row, and electrically conductive elements for connecting electric wires to each device, the mounting and connecting elements associated with each device being arranged in a second row which extends perpendicular to the first row, the improvement wherein: said assembly comprises a plurality of identical terminal board units connected together in an interlocked manner and lying in a common plane in the direction of the first row, each said unit containing all of the mounting and connecting elements for at least one electrical device; each said unit having two end walls extending perpendicularly to the second row in which its associated mounting and connecting elements are arranged, and being provided with insertion slits each extending from one of said end walls into the interior of said terminal board unit and oriented approximately parallel to a plane defined by the direction of the first row and the direction of the second row of said mounting and connecting elements associated with the respective unit, each said insertion slit holding a respective connecting element; each said terminal board unit has two opposed cover faces each extending between said end walls and parallel to the plane of orientation of said insertion slits; each said terminal board unit is provided with further recesses into each of which a respective insertion slit opens and each of which is open to a first one of said cover faces and to that one of said end walls from which its associated insertion slit extends, there being two said further recesses open to one of said end walls; the portions of each said unit delimiting two said further recesses which open to said one end wall are connected together only in the region of said first one of said cover faces; each said unit portion delimiting each one of said two further recesses is formed to give its associated further recess a U-shaped cross section in a plane parallel to said one end wall; each said unit includes a bar portion connection together said portions delimiting said two further recesses; and each said insertion slit is located approximately midway between the top and bottom of the U-shape defining its associated further recess.

* * * * *